US007023322B2

(12) United States Patent
Baumgardner et al.

(10) Patent No.: US 7,023,322 B2
(45) Date of Patent: Apr. 4, 2006

(54) GARAGE DOOR OPENING SYSTEM FOR VEHICLE

(75) Inventors: John D. Baumgardner, Holland, MI (US); Niall R. Lynam, Holland, MI (US); David W. Taylor, Fenton, MI (US)

(73) Assignee: Donnelly Corporation, Holland, MI (US)

( * ) Notice: Subject to any disclaimer, the term of this patent is extended or adjusted under 35 U.S.C. 154(b) by 50 days.

(21) Appl. No.: 10/770,736

(22) Filed: Feb. 3, 2004

(65) Prior Publication Data

US 2004/0257200 A1 Dec. 23, 2004

Related U.S. Application Data

(60) Provisional application No. 60/502,806, filed on Sep. 12, 2003, provisional application No. 60/444,726, filed on Feb. 4, 2003.

(51) Int. Cl.
*G05B 23/00* (2006.01)

(52) U.S. Cl. .................... 340/5.71; 340/5.61; 341/176

(58) Field of Classification Search ................ 341/176; 307/114; 160/188; 49/31, 199; 455/572, 455/16; 340/5.71, 5.61, 5.1, 5.25, 825.72, 340/5.7, 5.23, 825.69, 5.26, 426.1
See application file for complete search history.

(56) References Cited

U.S. PATENT DOCUMENTS

| | | | | |
|---|---|---|---|---|
| 4,241,870 | A | 12/1980 | Marcus | 296/37.7 |
| 4,247,850 | A | 1/1981 | Marcus | 340/694 |
| 4,595,228 | A | 6/1986 | Chu | 296/37.7 |
| 5,184,132 | A | 2/1993 | Baird | 341/176 |
| 5,479,155 | A | 12/1995 | Zeinstra et al. | 340/825.22 |
| 5,522,638 | A | 6/1996 | Falcoff et al. | 296/37.8 |
| 5,619,190 | A * | 4/1997 | Duckworth et al. | 340/5.25 |
| 5,627,529 | A | 5/1997 | Duckworth et al. | 340/825.69 |
| 5,661,455 | A | 8/1997 | Van Lente et al. | 340/525 |
| 5,680,263 | A | 10/1997 | Zimmermann et al. | 359/872 |
| 5,798,688 | A | 8/1998 | Schofield | 340/438 |
| 5,887,929 | A | 3/1999 | Miller et al. | 296/37.8 |
| 6,078,271 | A | 6/2000 | Roddy et al. | 340/825.72 |
| 6,091,330 | A | 7/2000 | Swan et al. | 340/539 |
| 6,126,221 | A | 10/2000 | Kern | 296/37.7 |
| 6,135,528 | A | 10/2000 | Sobieski et al. | 296/37.7 |
| 6,333,698 | B1 * | 12/2001 | Roddy | 340/825.72 |
| 6,362,771 | B1 * | 3/2002 | Schofield et al. | 341/176 |
| 6,396,408 | B1 | 5/2002 | Drummond et al. | 340/815.4 |
| 6,525,645 | B1 * | 2/2003 | King et al. | 340/5.7 |
| 6,556,681 | B1 | 4/2003 | King | 380/270 |
| 2003/0112121 | A1 * | 6/2003 | Wilson | 340/5.61 |

* cited by examiner

*Primary Examiner*—Brian Zimmerman
*Assistant Examiner*—William Bangachon
(74) *Attorney, Agent, or Firm*—Van Dyke, Gardner, Linn & Burkhart, LLP

(57) ABSTRACT

A vehicle-based door opening system for opening a door at a building includes a vehicle-based transmitting unit, a control and an actuating device. The transmitting unit is positioned at the vehicle and operable to transmit a first signal, and the actuating device is positioned at the building and receives the first signal from the vehicle-based transmitting unit. The control is operable to control at least one vehicle-based accessory, such as a door lock mechanism, in response to the first signal. The actuating device receives a domestic hand held garage door opener transmitting unit associated with a door opening device at or near the door and actuates the domestic hand held garage door opener transmitting unit in response to the first signal. The domestic hand held garage door opener transmitting unit transmits a second signal to actuate the door opening device to open or close the door.

31 Claims, 4 Drawing Sheets

GARAGE DOOR OPENING SYSTEM FOR VEHICLE

CROSS REFERENCE TO RELATED APPLICATIONS

The present application claims benefit of U.S. provisional applications, Ser. No. 60/444,726, filed Feb. 4, 2003 and Ser. No. 60/502,806, filed Sep. 12, 2003, which are hereby incorporated herein by reference in their entireties.

FIELD OF THE INVENTION

The present invention relates generally to the field of garage door opening systems and, more particularly, to a garage door opening system which utilizes a garage door opening mechanism, typically located at a roof portion of a garage, to open the garage door of a garage, and which utilizes a vehicle-based transmitting unit that causes an actuation of the garage door opening mechanism.

BACKGROUND OF THE INVENTION

It is known to provide a vehicle-based transmitting unit or device for actuating a garage door opening mechanism at a garage for opening a garage door at the vehicle owner's home. Examples of vehicle-based garage door opening devices are described in U.S. Pat. Nos. 6,556,681; 6,525,645; 6,396,408; 6,362,771; 5,798,688 and 5,479,155, and in U.S. Publication No. US 2003/0112121 A1, published Jun. 19, 2003, which are hereby incorporated herein by reference. Often, such vehicle-based transmitting units are learnable or trainable and must be "taught" the correct radio frequency (RF) and code for actuating the respective garage door opening mechanism at the home. The units may be trainable to learn the frequencies and codes of many garage door opening mechanisms available today, which may comprise rolling codes to provide enhanced security of the system and to reduce the ability of someone else to open the garage door with another remote or hand held garage door opener transmitting unit or device. An example of such a trainable device is a Homelink® device, commercially available from Johnson Controls, Inc., and such as disclosed in U.S. Pat. No. 5,479,155, incorporated by reference above. Another example of such a trainable device is a Kwiklink™ device, which also includes a trainable unit that in this case is located in the garage.

Because the trainable transmitting unit must be trained or set to communicate with a receiver of the garage door opening mechanism, the trainable transmitting unit or device thus includes a receiver or receiving device and costly and complex learning or training circuitry, logic circuitry and/or processing circuitry and/or algorithms so that the trainable transmitting device may receive and learn the appropriate frequency and code or codes so as to selectively transmit the appropriate frequency and code or codes for the garage door opening mechanism at the garage. The training or learning process may be accomplished by actuating the domestic hand held garage door opener transmitting unit (that typically is purchased by the home owner with the garage door opener or garage door opening mechanism) while the trainable transmitting unit is in the training mode, whereby the trainable transmitting device learns the correct code for actuating the particular garage door opening mechanism to open the particular garage door. Typically, in order to train the trainable transmitting units for use with rolling code garage door opening mechanisms, the homeowner must also press a button or the like at the garage door opening mechanism in the garage during the training process. This often requires the homeowner to climb a ladder to reach the garage door opening mechanism and may thus be awkward and time consuming to accomplish. Often, after the trainable transmitting unit is trained, the home owner may misplace or lose the domestic hand held garage door opener transmitting unit, since it is no longer used or needed to actuate the garage door opening mechanism to open the garage door.

It has been proposed to limit or avoid training of the vehicle-based garage door opening system by providing a vehicle-based transmitting unit and a remote actuating device for actuating a domestic hand held garage door opener transmitting unit, such as described in U.S. Pat. No. 6,362,771, which is hereby incorporated herein by reference. Although such a system works well for its intended purpose, it would be desirable to provide a system where the transmitting unit may utilize transmitting circuitry and codes associated with other accessories or systems or components of the vehicle.

Therefore, there is a need in the art for a garage door opening system which utilizes a vehicle-based transmitting unit and which overcomes the shortcomings of the prior art. There is also a need in the art for a vehicle-based garage door opening system which allows a vehicle owner to acquire and apply a vehicle-based transmitting unit associated with the vehicle and operable to transmit a signal to open or close a garage door, without requiring training of the transmitting unit and without requiring the associated costly training circuitry in the transmitting unit.

SUMMARY OF THE INVENTION

The present invention provides a garage door opening system which includes a vehicle-based transmitting unit which may be actuated from within a vehicle. The garage door opening system may include a receiver and a transmitter that are positionable at the garage and preferably near the garage door opening mechanism. The receiver may be associated with circuitry or algorithms that are trainable to learn a code of a domestic hand held garage door opening unit or transmitter (the term "domestic hand held unit" or transmitter refers to the small, portable hand held unit or transmitter that is associated with and typically sold with a garage door opening mechanism that is positioned in the garage). The transmitter may preferably transmit the code to the garage door opening mechanism in response to the receiver receiving a signal from the vehicle-based transmitting unit without a need to distinguish, store, and retransmit/replicate the frequency of the domestic hand held garage door opening unit/transmitter or that of the vehicle-based transmitting unit. Optionally, the garage-based unit may be connected to or hard-wired to the garage door opening mechanism and may directly actuate the garage door opening mechanism in response to receiving the signal from the vehicle-based transmitting unit. Optionally, the garage door opening system may utilize the domestic hand held garage door opener transmitting unit of a garage door opening device or mechanism at the garage, and may be generally seamless, such that the vehicle-based transmitting unit does not require training or coding to learn the code or codes of the domestic hand held garage door opener transmitting unit or the garage door opening mechanism.

Although shown and described as being applicable to garage door openers or opening mechanisms, the door opening system of the present invention may be equally applicable with other door opening devices or gate opening devices, such as for security gates or the like, without affecting the scope of the present invention.

The present invention provides an actuating device or unit that is positionable in a garage or elsewhere at a home and within the signal range of its transmitting unit to a garage door opening device or mechanism. The actuating device may include a receiver that receives a signal from the vehicle-based transmitting unit, and that may be coded or synchronized with the vehicle-based transmitting unit for rolling code type operation, and an actuator or transmitter that actuates the garage door opening device or mechanism or that transmits an appropriate signal or code to the garage door opening device or mechanism in response to the receiver receiving the signal from the vehicle-based transmitting unit.

The present invention also provides an actuating device or unit which is positionable in a garage or elsewhere at a home and within the signal range of a domestic hand held garage door opener transmitting unit to a garage door opening device for actuating a garage door opening mechanism. The actuating device may receive or hold or otherwise contact or connect to the domestic hand held garage door opener transmitting unit and may be operable to actuate the domestic hand held garage door opener transmitting unit in response to a signal from a vehicle-based transmitting unit, which may be positioned at the vehicle or may be a portable or hand held transmitting unit.

Preferably, the vehicle-based transmitting unit is operable to transmit a signal which is associated with the particular vehicle, such as a signal corresponding to or matching a signal from a keyless entry transmitting unit or device or key fob or the like. The actuating device and the vehicle-based transmitting unit are preferably associated with one another, and may be associated with the particular vehicle during manufacturing of the vehicle at the assembly plant, such that no training or learning or circuitry associated with such training or learning is required in the vehicle-based transmitting unit or actuating device in order for the actuating device to accept the signal transmitted by the vehicle-based transmitting unit.

According to an aspect of the present invention, a vehicle-based door opening system for opening a door at a building includes a vehicle-based transmitting unit, a control and an actuating device. The door is openable by a door opening device that is operable in response to a domestic hand held door opener transmitting unit associated with the door opening device. The vehicle-based transmitting unit is positioned at the vehicle and is operable to transmit a first signal in response to a user input. The control is operable to activate a door locking mechanism of the vehicle in response to the first signal to lock and unlock the vehicle doors. The actuating device is positioned at the building, such as at or near the door opening device, and has a receiver for receiving the first signal. The actuating device receives the domestic hand held door opener transmitting unit and is operable to actuate the domestic hand held door opener transmitting unit in response to the receiver receiving the first signal. The domestic hand held door opener transmitting unit is operable to transmit a second signal when actuated, wherein the second signal is received by the door opening device to open or close the door. The second signal is inoperable to lock and unlock the vehicle doors.

According to another aspect of the present invention, a vehicle-based door opening system comprises a vehicle-based transmitting unit positionable at a vehicle and an actuating device positionable at or near a door opening mechanism operable to open a door, such as a garage door or other automated door, or a security door or gate or the like. The actuating device includes a receiver for receiving a signal from the vehicle-based transmitting unit and a transmitter for actuating the door opening mechanism in response to the receiver receiving the signal. The actuating device includes code learning circuitry for learning a code associated with the door opening mechanism. The receiver may receive a signal transmitted by a domestic hand held transmitting unit associated with the door opening mechanism, and the code learning circuitry may learn the code transmitted by the hand held transmitting unit. The transmitter may transmit the learned code over a wide band of frequencies in response to the receiver receiving the signal from the vehicle-based transmitting unit without any need to learn/know/replicate the frequency of the signal transmitted by the hand held transmitting unit (or the vehicle-based transmitting unit). The transmitter thus may comprise a simple transmitter that does not have to be adaptable for the particular signal frequency that is transmitted by the hand held transmitting unit (or vehicle-based transmitting unit). Also, the code learning circuitry does not have to be capable of recognizing and learning the frequency of the signal transmitted by the hand held transmitting unit and, thus, may provide a reduction in the cost and complexity of the garage door opening system.

According to another aspect of the present invention, a vehicle-based door opening system comprises a vehicle-based transmitting unit positionable at a vehicle and an actuating device positioned at or near a door opening mechanism that is operable to open a door, such as a garage door or other automated door, or a security door or gate or the like. The actuating device includes a receiver for receiving a signal from the vehicle-based transmitting unit and an actuator for actuating the door opening mechanism in response to the receiver receiving the signal. The actuating device may be connected to the door opening mechanism, such as via a pair of wires connected to the terminals at the door opening mechanism that are suitable for use with a push button device mounted at a wall of the garage or the like, and the actuator may be operable to directly actuate the door opening mechanism in response to the receiver receiving the signal from the vehicle-based transmitting unit. The actuating device thus may not require any learning circuitry or algorithms because no learning of the code associated with the door opening mechanism may be required since the actuating device is connected directly to the door opening mechanism.

According to another aspect of the present invention, a vehicle-based door opening system comprises a vehicle-based transmitting unit positioned at a vehicle and an actuating device positioned at or near a door opening mechanism operable to open a door, such as a garage door or other automated door, or a security door or gate or the like. The door opening mechanism is operable to open the door in response to a signal from a domestic hand held door opener transmitting unit associated with the door opening mechanism. The vehicle-based transmitting unit is selectively operable to transmit a signal and the actuating device is operable to receive the signal from the vehicle-based transmitting unit. The vehicle-based transmitting unit is also operable to communicate with at least one vehicle-based accessory. The vehicle-based accessory may comprise at least one of a vehicle door locking mechanism, a vehicle ignition, an illumination source of the vehicle and/or the like. The actuating device is configured to receive the domestic hand held door opener transmitting unit associated with the door opening mechanism and is operable to actuate the domestic hand held door opener transmitting unit in response to the signal from the vehicle-based transmitting unit, whereby the domestic hand held door opener transmitting unit transmits the signal to actuate the door opening mechanism to open the door. The signal transmitted by the domestic hand held door opener transmitting unit is inoperable to control the vehicle-based accessory.

The actuating device may be operable to mechanically actuate the domestic hand held door opener transmitting unit in response to the signal from the vehicle-based transmitting unit. For example, the actuating device may include an actuating member which is movable to depress a button or control input on the domestic hand held door opener transmitting unit in response to the signal from the vehicle-based transmitting unit.

Optionally, the vehicle-based door opening system may include a portable vehicle-based transmitting unit associated with the vehicle, such as a keyless entry transmitting device, a remote vehicle ignition starter and/or the like. Optionally, the vehicle-based transmitting unit may be fixedly positioned at the vehicle. Optionally, the vehicle-based transmitting unit may be positioned at an interior rearview mirror assembly of the vehicle, an accessory module of the vehicle, a windshield electronics module, a console of the vehicle, an instrument panel of the vehicle, a steering wheel of the vehicle and/or a keyless entry transmitting device or pod associated with the vehicle, such as a key fob for actuating the door locks of the vehicle and/or the like.

The vehicle-based transmitting unit may be associated with the actuating device, such that no training of the vehicle-based transmitting unit or the actuating device may be necessary, whereby the vehicle-based transmitting unit and the actuating device may be purchased together as a unit or system. For example, the vehicle-based transmitting unit may be associated with the actuating device and the vehicle or vehicle-based accessory at the vehicle assembly plant, or may be associated with the actuating device and vehicle-based accessory and purchased together as an aftermarket unit or system.

Therefore, the present invention provides a vehicle-based garage door opening system which may not require any training of the codes of the garage door opening mechanism or domestic hand held garage door opener transmitting unit. The vehicle-based garage door opening system thus does not require complex and costly receiving and/or training circuitry for the vehicle-based transmitting unit and/or the actuating device. The present invention thus provides a low cost vehicle-based garage door opening system which may utilize the existing domestic hand held garage door opener transmitting unit associated with and typically purchased with the garage door opening mechanism. The present invention may also provide a vehicle-based transmitting unit which transmits a signal which is associated with and substantially unique to a particular vehicle and/or vehicle-based accessory, and which may correspond to existing transmitting devices and signals of the vehicle, such as keyless entry transmitting devices and signals and/or the like.

These and other objects, advantages, purposes and features of the present invention will become apparent upon review of the following specification in conjunction with the drawings.

DESCRIPTION OF THE PREFERRED EMBODIMENTS

Figure 2:
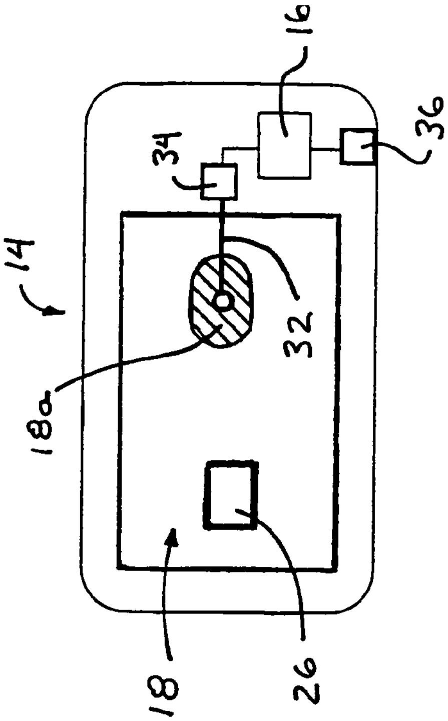
FIG. 2 is a plan view of a receiving and actuating device useful with the garage door opening system of FIG. 1, with a domestic hand held garage door opener transmitting unit received therein.
Figure 1:
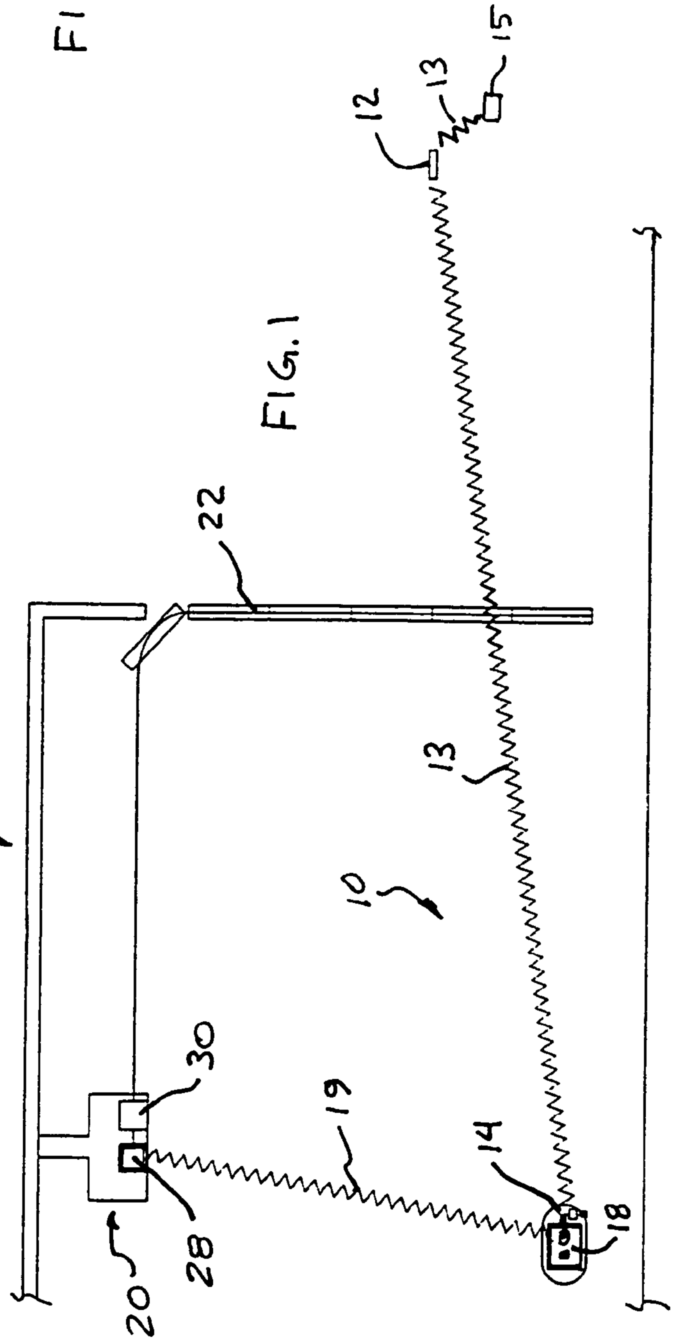
FIG. 1 is a side elevation of a garage door opening system in accordance with the present invention, as positioned at a garage.

Referring now to the drawings and the illustrative embodiments depicted therein, a vehicle garage door opening system 10 comprises a vehicle-based transmitting unit or transmitter 12 and an actuating device and/or receiving device 14 (FIGS. 1 and 2). Vehicle-based transmitting unit 12 may be positionable at or in a vehicle (not shown) and may be selectively actuated by a user to transmit a signal 13. Actuating device 14 includes a receiver 16, such as a radio frequency (RF) receiver or the like, for receiving the signal 13 from vehicle-based transmitting unit 12. Actuating device 14 is operable to actuate a domestic hand held garage door opener transmitting unit 18, which is associated with a garage door opener or garage door opening device 20 at a garage door 22 of a garage 24. The domestic hand held garage door opener transmitting unit 18 is operable to transmit a second signal 19 to a receiver 28 at the garage door opening device 20 in response to actuation of the domestic hand held garage door opener transmitting unit 18 by actuating device 14, as discussed below. Although shown and described as being applicable to a garage door opening device, the door opening system of the present invention may be equally applicable to other types of door opening devices or gate opening devices, such as for security gates or the like, without affecting the scope of the present invention.

Domestic hand held garage door opener transmitting unit 18 may comprise any conventional small, portable, remote domestic hand held garage door opener transmitting unit, and is typically associated with and purchased with the garage door opening device 20. Domestic hand held garage door opener transmitting unit 18 includes a transmitter 26 which is operable to transmit a signal 19 (in response to a user input) to the receiver 28 at garage door opening device 20 to open the garage door 22, as is well known in the art. Such garage door opening devices and domestic hand held garage door opener transmitting unit are typically packaged and sold together, such that the signal 19 transmitted by the domestic hand held garage door opener transmitting unit is properly received and recognized by the receiver 28 of the garage door opening device 20. Typically, the domestic hand held garage door opener transmitting unit 18 includes a button 18*a*, which may be pressed or moved to actuate the transmitter 26 to transmit the signal 19. Garage door opening device 20 includes receiver 28, which receives signal 19 from domestic hand held garage door opener transmitting unit 18, and is operable to actuate a garage door opening mechanism 30 to open garage door 24 in response to signal 19 from domestic hand held garage door opener transmitting unit 18. The signal 19 may comprise a radio frequency (RF) signal and may comprise a rolling code signal which changes automatically to provide enhanced security and to limit or substantially preclude another transmitting device from actuating the garage door opening device or mechanism. As can be seen in FIG. 2, button 18*a* of domestic hand held garage door opener transmitting unit 18 may be actuated by actuating device 14 in response to vehicle-based transmitting unit 12, as discussed below.

Vehicle-based transmitting unit 12 is positionable at or within the vehicle and is selectively operable to transmit signal 13, which may comprise a radio frequency (RF) signal and may comprise a rolling code signal, in response to a user input or actuation of vehicle-based transmitting unit 12. Vehicle-based transmitting unit 12 may be selectively actuated to transmit signal 13 to actuating device 14 to cause actuation of domestic hand held garage door opening transmitting unit 18 to actuate the garage door opening device 20 to open or close the garage door, as discussed in detail below. Vehicle-based transmitting device may also be selectively actuated to communicate with or actuate one or more vehicle-based accessories. For example, signal 13 transmitted by vehicle-based transmitting unit 12 may also be receivable by at least one vehicle-based receiver associated with or in communication with at least one vehicle-based accessory, or vehicle-based transmitting unit 12 may be selectively operable to transmit a second distinct signal which communicates with or actuates at least one vehicle-based accessory or is received by a vehicle-based receiver associated with or in communication with at least one vehicle-based accessory. The vehicle-based accessory may comprise a vehicle door locking mechanism, a remotely operable vehicle ignition starter, an illumination source of the vehicle and/or the like. The vehicle-based accessory may thus be operable to actuate the vehicle door locking mechanism to lock or unlock the doors of the vehicle, or may actuate a vehicle ignition starter, or may actuate a vehicle light or lighting system, such as interior lights, security lights and/or the like, in response to a signal transmitted by the vehicle-based transmitting unit 12.

Vehicle-based transmitting unit 12 may be fixedly mounted within the vehicle, such as at or within an interior rearview mirror assembly of the vehicle, an accessory module of the vehicle, a console of the vehicle, an instrument panel of the vehicle, a steering wheel of the vehicle and/or the like, without affecting the scope of the present invention. The interior rearview mirror assembly of the vehicle may comprise any mirror assembly, and may include other accessories, such as disclosed in U.S. Pat. No. 6,396,408, which is hereby incorporated herein by reference. Vehicle-based transmitting unit 12 may include a user actuatable input, such as one or more buttons, switches or the like, for actuation by a user of the vehicle garage door opening system 10, who may be seated or positioned within the vehicle, such as the driver of the vehicle or a passenger of the vehicle. Optionally, vehicle-based transmitting unit 12 may be operable to transmit the signal in response to other user inputs, such as a voice command or the like, without affecting the scope of the present invention. Optionally, the garage door opening system may include a hand held or portable transmitting device which may be associated with the vehicle, such as a keyless entry transmitting device or pod, such as a key fob or the like, which may function to lock and unlock the door locks of the vehicle, and which the user may carry, whereby the vehicle garage door opening system 10 may be usable and actuatable from outside of the vehicle as well, without affecting the scope of the present invention.

Actuating device 14 is positionable at the building, such as at or in or near the garage 24, and within the communication distance between domestic hand held garage door opener transmitting unit 18 and receiver 28 of garage door opening device 20. Actuating device 14 is shaped or configured to receive or hold a typical domestic hand held garage door opener transmitting unit, such as partially within a pocket or cavity or bin or cradle or the like formed in actuating device 14. The pocket or cavity may be formed to receive any typical and conventional domestic hand held garage door opener transmitting unit, and may be formed in different shapes or contours or may provide adaptors or the like to accommodate the various domestic hand held garage door opener transmitting units sold with garage door opening devices. The domestic hand held garage door opener transmitting unit 18 thus may be received within or partially within actuating device 14, which may also include a cover or the like (not shown) to close over the domestic hand held garage door opener transmitting unit to substantially encase the domestic hand held garage door opener transmitting unit within actuating device 14.

Actuating device 14 includes an actuating member or arm or pin 32 and a motor or drive mechanism 34, which is operable to pivot or move actuating member 32, as discussed below. Actuating device 14 also includes a power supply or source 36, which may comprise a battery or the like or may comprise an electrical connection to a remote power source, such as a plug-in connection to an electrical outlet (not shown) in the garage 24, or the like. When the domestic hand held garage door opener transmitting unit 18 is positioned within the receiving area or pocket of actuating device 14, actuating member 32 is positioned generally at or above the button area of the button 18*a* of domestic hand held garage door opener transmitting unit 18 and is operable or movable to depress or actuate the button 18*a* of domestic hand held garage door opener transmitting unit 18 via actuation of motor or drive mechanism 34 in response to signal 13 from vehicle-based transmitting unit 12, as discussed below.

Drive mechanism 34 is operable to cause movement of actuating member 32 to actuate the button 18*a* of domestic hand held garage door opener transmitting unit 18. Drive mechanism 34 may comprise any type of drive mechanism or motor, such as, for example, a linear actuator, a solenoid device, an electrical drive motor or actuator, such as the types disclosed in U.S. Pat. Nos. 6,116,743 and/or 6,390,635, which are hereby incorporated herein by reference, a non-armature electrical motor, a shape memory alloy (SMA) device or an electrically induced stress-strain device or actuator, such as a NanoMuscle™ device or the like, a bio-material or the like. For example, a conventional solenoid may be used for a drive motor. Optionally, a shape memory alloy device or electrically induced stress-strain actuator or the like may be implemented, such as a NanoMuscle™ actuator, such as a 70 gram High Speed/High Efficiency Linear Actuator, a 125 gram High Speed/High Efficiency Linear Actuator, or a 195 gram High Speed/High Efficiency Linear Actuator, all of which are commercially available from NanoMuscle, Inc. of Antioch, Calif. Such electrically induced stress-strain linear actuators comprise a selection and/or combination of metallic elements, typically bimetallic elements, such as bimetallic alloys, which may contract in response to electrical actuation and may extend or return to their original state when the electrical actuation is removed. More particularly, such electrically induced stress-strain actuators, such as the NanoMuscle™ actuator or the like, contract in response to one or more electrically resistive shape memory alloy wires contracting as they are heated with application of a suitable voltage. Often such linear actuators may incorporate a spring or other biasing member or return force device or mechanism to urge or assist the actuator to its original, non-contracted state when the electrical actuation is removed. The actuator may be mounted at the actuating device or bin such that contraction of the actuator results in a corresponding actuation or depression of button 18*a* of domestic hand held garage door opener transmitting unit 18. Other such contracting or extending devices, which may comprise metallic or polymeric components, or any other type of drive mechanism, may be implemented to actuate or depress a button or the like of a domestic hand held garage door opener transmitting unit, without affecting the scope of the present invention.

Vehicle-based transmitting unit 12 and receiver 16 of actuating device 14 are correspondingly coded or calibrated or preset, such that signal 13 from vehicle-based transmitting unit 12 is properly received and recognized by receiver 16 of actuating device 14 and properly received by the vehicle-based receiver associated with the corresponding vehicle-based accessory. Actuating device 14 and vehicle-based transmitting unit 12 of vehicle garage door opening system 10 are thus associated with one another and may be provided or sold as a unit, such that vehicle-based transmitting unit 12 may properly communicate with actuating device 14, without requiring training or calibrating or coding of either the vehicle-based transmitting unit 12 or the receiver 16 of actuating device 14 by the user after purchasing the system. Optionally, vehicle-based transmitting unit 12 and actuating device 14 and the vehicle accessory may thus be packaged and sold as an aftermarket unit, whereby actuating device 14 may be placed at the garage, while vehicle-based transmitting unit 12 may be installed or positioned at or within the vehicle, such as fixedly positioned in the vehicle or in an interior rearview mirror or accessory module or windshield electronics module or console or the like of the vehicle, or may be carried by a user, such as similar to a keyless entry device or pod or key fob or the like, and the vehicle-based accessory may be installed or positioned at or within the vehicle. For example, the vehicle-based transmitting unit and the actuating device and the vehicle-based accessory may be sold as a vehicle-based aftermarket unit or system or may be packaged and sold with a conventional garage door opening device and domestic hand held garage door opener transmitting unit, without affecting the scope of the present invention.

Optionally, the vehicle garage door opening system 10 may be associated with the vehicle or vehicle accessory, such as during assembly of the vehicle at a vehicle manufacturing plant, whereby vehicle-based transmitting unit 12 may be operable to generate a signal which is also associated with an accessory of the vehicle. For example, vehicle-based transmitting unit 12 may comprise a component or circuitry of a keyless entry transmitting device or pod or key fob or the like associated with a particular vehicle. The keyless entry transmitting device may generate different signals for unlocking or locking the door locks of the vehicle and may transmit signal 13 to actuating device 14, or the signal 13 transmitted to actuating device 14 may generally correspond with and function to also actuate some other accessory of the vehicle, such as the door locks or the like. For example, a button on the keyless entry device or pod or key fob may transmit signal 13, which actuates actuating device 14 and also functions to actuate a door lock mechanism to lock or unlock the doors of the vehicle, or a separate button may be provided on the keyless entry transmitting device which may only function to transmit signal 13 to actuate actuating device 14.

In such vehicle associated applications, the receiving circuitry and code of the vehicle (which receives the lock/unlock signal from the keyless entry transmitting device or module or pod) may be substantially replicated at the receiver 16 of actuating device 14, such that the keyless entry transmitting device is in communication with the receiver of actuating device 14. Because the keyless entry code is substantially unique for each vehicle, by substantially replicating the receiver code of the vehicle in the actuating device of the vehicle garage door opening system, the present invention provides a garage door opening code or signal which is unique to the vehicle and which utilizes the transmitting circuitry and codes or signals which are already in existence and already part of or associated with the vehicle as the vehicle is being manufactured and assembled. Also, the garage door opening system of the present invention thus avoids having to teach or train the garage door opener to learn and recognize a new signal, and also avoids having to teach or train the transmitting unit from having to learn and transmit a new signal. The vehicle-based transmitting unit of the garage door opening system of the present invention thus may add little if any to the cost of the vehicle-based garage door opening system, since the vehicle-based transmitting unit is already part of and/or associated with the vehicle, and does not require learning circuitry and the like. Also, because the present invention does not impact the garage door opener at the garage, the present invention provides a garage door opening system that does not have to deal with the complexities of the rolling codes associated with the garage door opener. The garage door opening system of the present invention utilizes the circuitry and security codes and secure signals already built into and/or associated with the vehicle for use with the door lock/unlock mechanism, and thus provides a secure garage door opening system without additional circuitry, codes and signals and without having to train or learn new codes with costly learning circuitry and the like.

Optionally, in some such vehicle associated applications, the vehicle-based transmitting unit and any user actuatable controls associated therewith, which may be positioned at or within an interior rearview mirror assembly of the vehicle, an accessory module of the vehicle, a console of the vehicle, an instrument panel of the vehicle, a steering wheel of the vehicle, and/or a keyless entry transmitting device of the vehicle or the like, and the actuating device may be associated with the vehicle during manufacturing and assembly of the vehicle, such that they are provided to the consumer with the vehicle. For example, the vehicle-based transmitting unit may comprise a component of a keyless entry transmitting device of the vehicle, and the keyless entry device and actuating device may be packaged in the vehicle as is currently done with conventional keyless entry transmitting devices or key fobs. Optionally, the vehicle-based transmitting unit may be positioned at or at least partially within other portions of the vehicle, such as at or at least partially within an interior rearview mirror assembly of the vehicle, an accessory module of the vehicle, a console of the vehicle, an instrument panel of the vehicle, a steering wheel of the vehicle or the like, and may include one or more control buttons or user inputs at the vehicle, such as at the interior rearview mirror assembly of the vehicle, the accessory module of the vehicle, the console of the vehicle, the instrument panel of the vehicle, the steering wheel of the vehicle or the like, without affecting the scope of the present invention. The control buttons or user inputs may actuate the vehicle-based transmitting unit of the vehicle-based garage door opening system, and may optionally actuate another accessory of the vehicle, such as the door locks of the vehicle or the like, without affecting the scope of the present invention.

Preferably, vehicle-based transmitting unit 12 is positioned within the vehicle and comprises the same or substantially the same transmitting circuitry as the key fob associated with the door lock mechanism of the vehicle (or at least is operable to transmit the same signal as the key fob). The vehicle-based transmitting unit 12 may be actuated by a button or other user input within the vehicle, such as at an interior rearview mirror assembly of the vehicle or at an accessory module or windshield electronics module or at a console or the like of the vehicle. Actuation of the button or input causes vehicle-based transmitting unit 12 to transmit the signal 13 to actuate actuating device 14. The same signal 13 may also be received by or communicated to a control box or circuitry 15, which is positioned in the vehicle and is operable to actuate the vehicle door lock mechanism to lock or unlock the doors of the vehicle in response to the signal 13. The control box or circuitry 15 may include a receiver for receiving the signal 13 from either the key fob or the vehicle-based transmitting unit 12. The vehicle-based receiver and/or control circuitry may be associated with other accessories of the vehicle, such as, for example, a tire pressure monitoring system (TPMS), such as the types disclosed in U.S. Pat. Nos. 6,294,989; 6,445,287; and/or 6,472,979; and U.S. patent application, Ser. No. 10/206,495, filed Jul. 26, 2002, now U.S. Pat. No. 6,731,205, which are hereby incorporated herein by reference.

The actuating device 14, transmitting unit 12, key fobs and the door lock control circuitry 15 may all be packaged together and associated with one another when shipped to the vehicle assembly plant, and may all be installed in or placed in or associated with a particular vehicle at the vehicle assembly plant. For example, the packaged system may be provided to a vehicle as the vehicle moves through the vehicle assembly plant. The control box or circuitry that receives the signal from the key fob and unlocks the vehicle doors may be installed in the vehicle, while the vehicle-based transmitting unit associated with the control box and key fob may also be installed in the vehicle. The key fob or key fobs associated with the control circuitry and the actuating device associated with the key fob and the vehicle-based transmitting unit are placed within the vehicle so that they remain with the vehicle as the vehicle is assembled.

After the vehicle is purchased, the actuating device 14 may be positioned at the building or home, such as in or at or near the garage, of the vehicle owner and the domestic hand held transmitting unit 18 associated with the garage door opener 20 may be placed in the actuating device. The actuating device 14 and the control circuitry 15 of the door locks are associated with and set to receive and recognize the signal 13 transmitted by the key fob (such as when a "door unlock" button is pressed) and by the vehicle-based transmitting unit 12 (in response to a user input, such as actuation of a button or switch or a voice command or the like). Activation of the key fob button or buttons and/or activation of the vehicle-based transmitting unit thus functions to lock/unlock the vehicle doors and to actuate the actuating device to open/close the garage door at which the actuating device is positioned. The key fob may include other buttons to transmit other signals to the control at the vehicle, where the control (or another control or circuitry of the vehicle that receives and recognized the other signals) may be operable to control another accessory or component of the vehicle, such as to sound an alarm or horn of the vehicle or to activate the vehicle ignition or to activate lights of the vehicle or to open the trunk of the vehicle or the like, in response to the other signal or signals transmitted by the key fob.

Optionally, the door lock mechanism or system or control 15 may include an override function or control or circuitry that is activated/deactivated via a user input, such as a button or switch or other user input or the like, that may be selectively actuated by a driver or occupant of the vehicle to cause the door lock mechanism to not respond to the signal 13 transmitted by the vehicle-based transmitting unit 12, such that the signal will only activate the actuating device at the garage and will not also activate the door lock mechanism. The override function thus may prevent the user from locking/unlocking the doors of the vehicle when intending to only open/close the garage door, such as when the vehicle is approaching or driving away from the garage door. The override function may be deactivated or switched back to having the door lock mechanism or control 15 be responsive to the signal 13. For example, the override function may be deactivated in response to a user input or may automatically switch off or deactivate in response to a deactivating event, such as after a period of time following the activation of the override function, or after a vehicle door is opened and/or closed, or after the vehicle ignition is turned on and/or off, or when the vehicle is stopped or substantially slowed to a threshold speed, or the like, such that the override function will not be accidentally left activated. This is desired because, when the override function is activated, the user may not be able to unlock the vehicle doors with the portable key fob when outside of the vehicle. Optionally, the override function may be automatically activated to cut off the door lock mechanism (or make the door lock mechanism non-responsive to signal 13) in response to an activating event, such as in response to a user input, activation or deactivation of the vehicle ignition, opening or closing of a vehicle door, locking or unlocking of a vehicle door, and/or movement of the vehicle (such as movement above a threshold speed) and/or the like. The override function may be automatically activated when the vehicle is moving since such movement is typically when one may want to open/close the garage door (as the vehicle approaches or moves away from the garage) rather than lock/unlock the vehicle doors. The override function may also be automatically deactivated as described above.

Accordingly, the manufacturer of the door lock control system, which manufactures the control box or circuitry and the key fob associated therewith and/or supplies the control box or circuitry and the key fob to the vehicle assembly plant, may now provide the same control box/circuitry and key fob and a new transmitting device and actuating device to the vehicle assembly plant. The new transmitting device is installed in the vehicle and is operable to transmit the same signal as the key fob. The actuating device may be positioned at or in the home or building or at or near a garage door opener at the home of the vehicle owner and may be operable to open the garage door in response to the signal from the transmitting device or key fob. The actuating device may receive the domestic hand held transmitting unit and may mechanically actuate the domestic hand held transmitting unit in response to the signal from the vehicle-based transmitting device or key fob. The key fob thus may be used by a user to open the garage door and the vehicle doors, which may be particularly useful in situations where a person is outside of their home and is not in their vehicle, yet has their keys with them.

In situations where a consumer owns two or more vehicles, it is envisioned that a vehicle-based garage door opening system in accordance with the present invention may be provided for and/or associated with each of the vehicles. For example, two vehicle garage door opening systems of the present invention may be provided for two different vehicles. Each of the actuating devices may be positioned at the home or in the garage and may house or contain an appropriate domestic hand held garage door opener transmitting unit (such as the same domestic hand held garage door opener transmitting units for a single garage door opener, such as for a double stall garage door where both vehicles may enter through the same garage door, or different domestic hand held garage door opener transmitting units for different garage door openers, such as for separate single stall garages where each vehicle may enter through different garage doors). The vehicle-based transmitting unit of the respective vehicle garage door opening system and vehicle thus may function to actuate the appropriate actuating device and, thus, the appropriate domestic hand held garage door opener transmitting unit at the actuating device. Optionally, a single actuating device and a vehicle-based transmitting unit may be provided, along with a second vehicle-based transmitting unit for a second vehicle, whereby each vehicle-based transmitting unit is operable to communicate the signal to the single actuating device at or in the garage, without affecting the scope of the present invention. Optionally, two or more actuating devices may be configured to receive signals from respective vehicle-based transmitting devices of one or more vehicles, such that, for example, a user may actuate either of two inputs or buttons in the vehicle to actuate the corresponding actuating device to open/close the desired door.

Therefore, the vehicle-based garage door opening system of the present invention does not require training of codes associated with the garage door opener at the garage door. Because the vehicle-based transmitting unit and the actuating device are associated with one another and correspondingly coded, no coding or teaching or setting up the devices after purchase of the system is required. The present invention thus eliminates the need to train the vehicle-based garage door opening system. Therefore, the vehicle-based transmitting unit and the receiving and actuating device of the vehicle-based garage door opening system of the present invention do not require costly learning or training circuitry to learn or train the units or devices to transmit or recognize other codes. The vehicle-based transmitting unit thus may comprise a transmitter only, and does not need to include any receiver or learning circuitry associated therewith. Because the vehicle-based transmitting unit is operable to communicate with or actuate a vehicle-based accessory, at least some of the costs associated with the vehicle-based transmitting unit are associated with the vehicle-based accessory, such that the overall additional costs associated with the vehicle-based garage door opening system are reduced.

The set up process of the vehicle garage door opening system of the present invention thus involves positioning and/or plugging in the actuating device at the home or garage and placing the domestic hand held garage door opener transmitting unit (that is typically purchased with the garage door opening device) at or at least partially within the actuating device or bin. The domestic hand held garage door opener transmitting unit is already coded to the garage door opening device, and the vehicle-based transmitting unit is also already coded to the actuating device, such that no training is required for either system. The present invention thus provides a low cost, already trained garage door opening system which may be associated with the vehicle and which may provide rolling codes or the like to enhance security and to limit or substantially preclude another person from using the same code to open the garage door.

Figure 3:
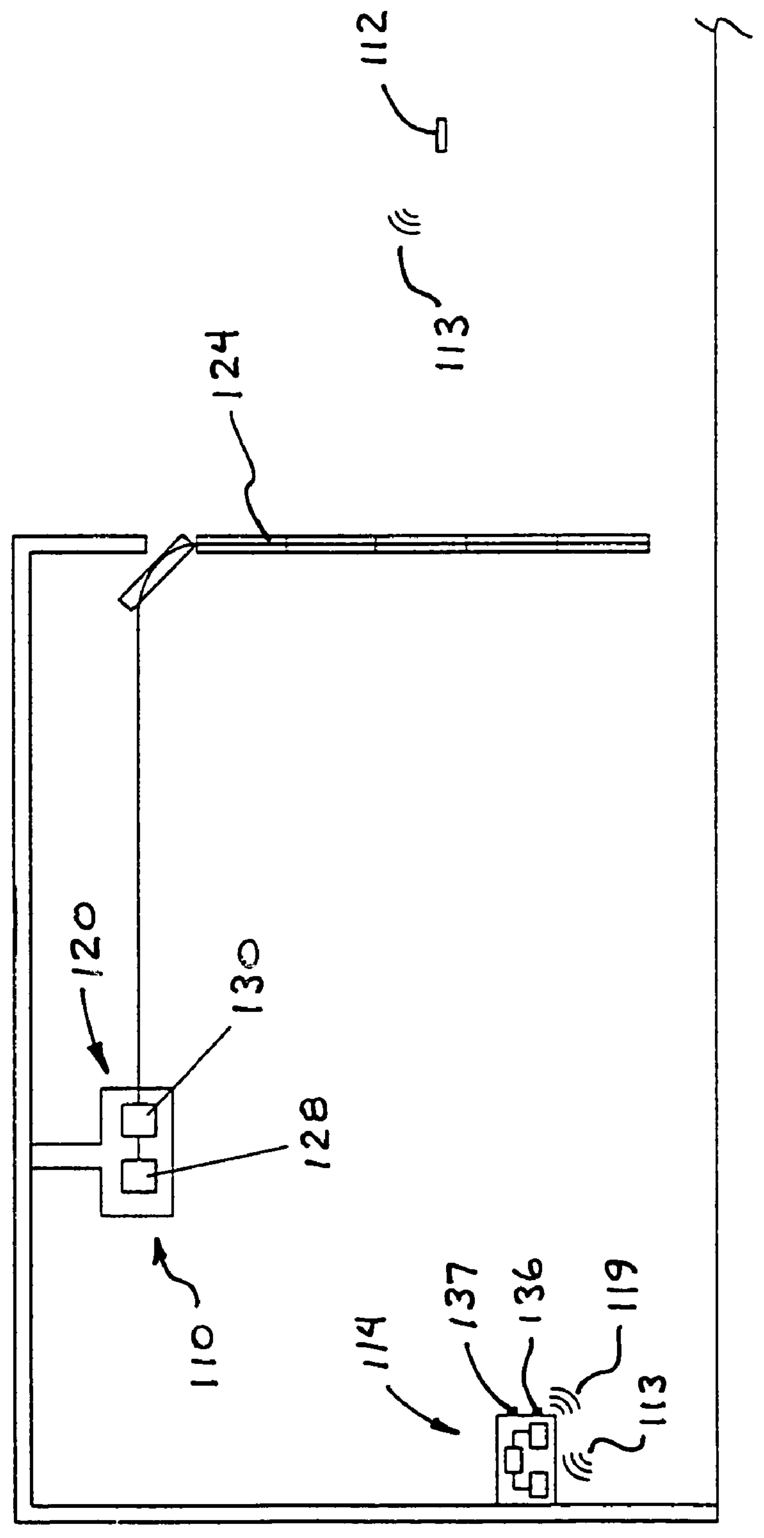
FIG. 3 is a side elevation of another garage door opening system in accordance with the present invention, as positioned at a garage.
Figure 4:
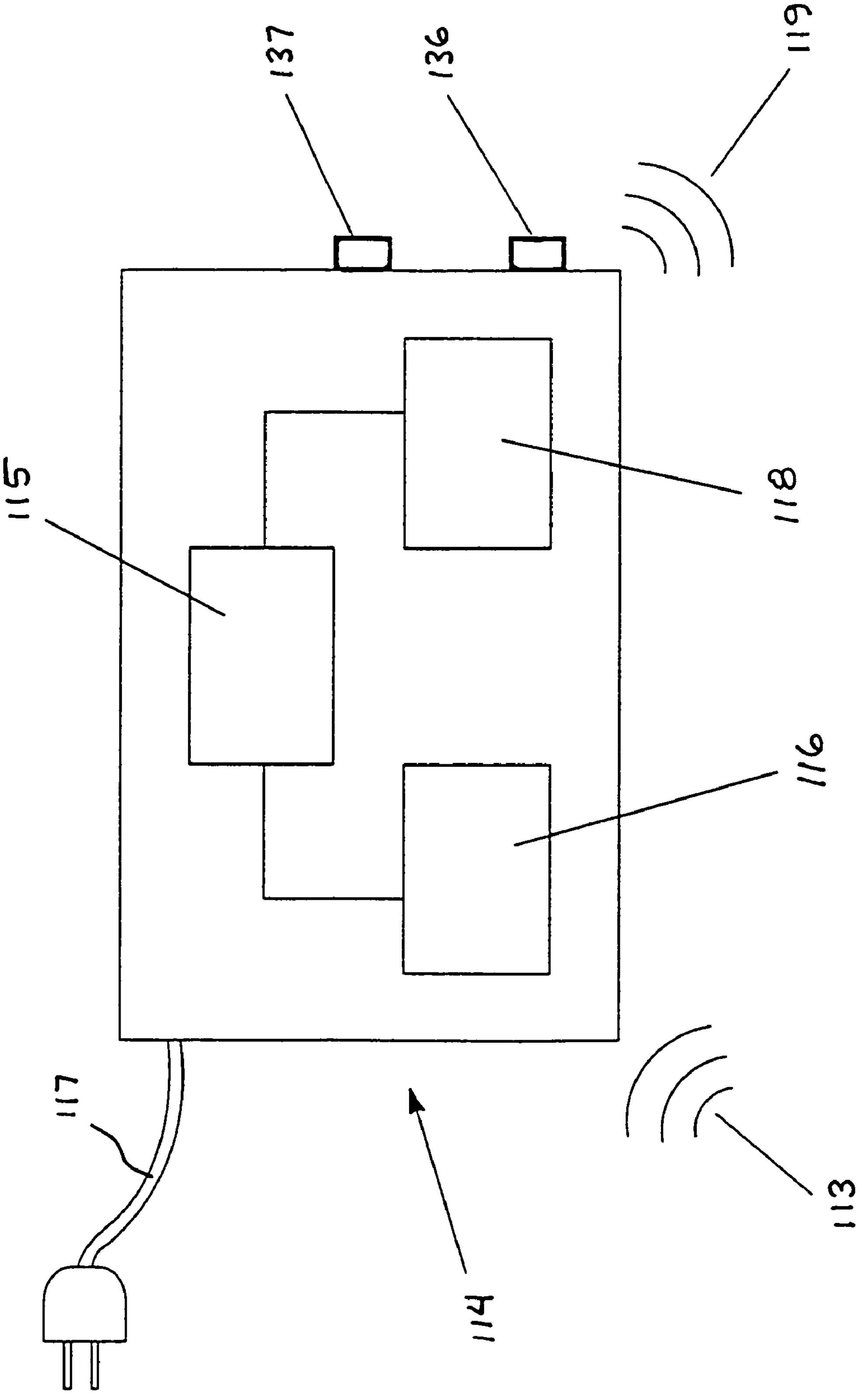
FIG. 4 is a plan view of a receiving and actuating device useful with the garage door opening system of FIG. 3.

Referring now to FIGS. 3 and 4, a vehicle garage door opening system 110 comprises a vehicle-based transmitting unit or transmitter 112 and an actuating device 114 that is located outside of and is remote from the vehicle (such as in a garage attached to a house or the like). Vehicle-based transmitting unit 112 may be similar to vehicle-based transmitting unit 12 discussed above, and may be positionable at or in a vehicle (preferably at or close to an interior rearview mirror or a windshield electronics module or the like) or may be a portable unit, and may be selectively actuated by a user to transmit a signal 113, such as a radio frequency (RF) signal or the like. As shown in FIG. 4, actuating device 114 includes a receiver 116, such as a radio frequency (RF) receiver or the like, for receiving the signal 113 from vehicle-based transmitting unit 112. Actuating device 114 also includes an actuator or transmitter 118 that is operable to transmit a signal 119 to a receiver 128 at the garage door opening device 120 in response to receiver 116 receiving the signal 113 from vehicle-based transmitting unit 112. Although shown and described as being applicable to a garage door opening device, the door opening system of the present invention may be equally applicable to other types of door opening devices or gate opening devices, such as for security gates or the like, without affecting the scope of the present invention.

As discussed above, the garage door opening device includes receiver 128, which is operable to receive signal 119 and to trigger or actuate a garage door opening mechanism 130 to open garage door 124 in response to the receiver 128 receiving the signal 119 from the transmitter 118 of actuating device 114. The signal 119 transmitted by transmitter 118 may comprise a radio frequency (RF) signal and may comprise a rolling code signal which changes automatically to provide enhanced security and to limit or substantially preclude another transmitting device from actuating the garage door opening device or mechanism. The signal 119 may comprise a broad band signal, as discussed below. Preferably, signal 119 has a different carrier frequency than signal 113, and most preferably, any data code or identifier carried on carrier signal 119 (such as via modulation or the like) is different than any data code or identifier carried on signal 113.

Vehicle-based transmitting unit 112 may be selectively actuated to transmit signal 113 to receiver 116 of actuating device 114 to cause transmitter 118 to transmit signal 119 to garage door opening device 120 to actuate garage door opening mechanism 130 to open or close the garage door 124. Vehicle-based transmitting unit 112 and receiver 116 of actuating device 114 may be correspondingly coded or calibrated or preset, such that signal 113 from vehicle-based transmitting unit 112 is properly received and recognized by receiver 116 of actuating device 114. Actuating device 114 and vehicle-based transmitting unit 112 of vehicle garage door opening system 110 may thus be associated with one another and may be provided or sold or packaged as a unit, such that vehicle-based transmitting unit 112 may properly communicate with actuating device 114, without requiring training or calibrating or coding of either the vehicle-based transmitting unit 112 or the receiver 116 of actuating device 114 by the user or homeowner after purchasing the system. Optionally, vehicle-based transmitting unit 112 and actuating device 114 may be packaged and sold as an aftermarket unit or system, whereby actuating device 114 may be placed at the garage, while vehicle-based transmitting unit 112 may be installed or positioned at or within the vehicle or may be carried by a user, such as similar to a keyless entry device or pod or key fob or the like. For example, the vehicle-based transmitting unit and the actuating device may be sold as a vehicle-based aftermarket unit or system or may be packaged and sold with a conventional garage door opening device, without affecting the scope of the present invention. Because the receiver 116 of actuating device 114 may be associated with, coded with, synchronized with, or operable to recognize the coded signal of the vehicle-based transmitting unit 112, the vehicle-based transmitting unit 112 may comprise a low cost transmitting unit that does not include costly learning circuitry and algorithms and the like.

Actuating device 114 is positionable outside of and remote from the vehicle and at or near the garage and within the communication distance between transmitter 118 of actuating device 114 and receiver 128 of garage door opening device 120. Actuating device 114 may be positioned at or near an outlet or the like of the garage or building and may include a plug 117 for plugging into the electrical outlet, or may be connectable to another power source or may include another power source, without affecting the scope of the present invention. Actuating device 114 may include code learning circuitry or algorithms 115 that is/are operable to learn a code associated with the receiver 128 of garage door opening device 120, such that transmitter 118 may transmit an appropriately coded signal to the receiver 128 of garage door opening device 120. Optionally, and desirably, code learning circuitry 115 may be set to be operable to recognize and learn the particular code that is transmitted by the hand held transmitting unit associated with and typically purchased with the garage door opening device 120. For example, the actuating device 114 may be set to a code learning mode (such as via a user pressing a user input or button 136 or the like on the actuating device) and the hand held transmitting unit may be actuated (such as by a user depressing the button of the hand held transmitting unit). The receiver 116 may receive the signal from the hand held transmitting unit and the code learning circuitry 115 may then learn or recognize the code that is superimposed on the signal. For example, the hand held transmitting unit may transmit a signal at a particular frequency and with a particular code superimposed on or in the signal, and the code learning circuitry may learn the code and preferably may learn the code irrespective of the frequency of the signal transmitted by the hand held transmitting device.

The code learning circuitry 115 may then provide the learned code to the transmitter 118 of actuating device 114, such that transmitter 118 may be operable to transmit an appropriately coded signal to the garage door opening device 120. The transmitter 118 may comprise a wide band transmitter that is operable to transmit a signal over a wide band or range of frequencies. Such a transmitter may be desirable because it may be less costly than some narrow band transmitters or other transmitters that may be adaptable to reproduce or replicate the code and frequency that may be received and learned. Also, such a wide band or broad band transmitter may be more universally adaptable for garage door opening devices that operate at different frequencies.

The transmitter 118 of actuating device 114 thus may provide an appropriate and recognizable signal 119 to the receiver 128 of garage door opening device 120, without requiring costly circuitry and transmitting devices that identify the particular frequency and code of a signal and that may reproduce or replicate the frequency and code of the identified signal. Thus, when learning occurs, there is no need for the system to know, recognize or distinguish the incoming frequency or to ever store the signal frequency, and there is no need for the transmitter of the actuating device to replicate the signal that is received from the hand held transmitting unit associated with the garage door opening device. The receiver 116 of actuating device 114 thus receives and recognizes the signal 113 from the vehicle-based transmitting unit 112 and automatically actuates the transmitter 118 to send a broad band signal 119 with the appropriate code to the garage door opening device 120.

In situations where a consumer owns two or more vehicles, it is envisioned that the vehicle-based garage door opening system of the present invention may be provided for and/or associated with each of the vehicles. For example, two vehicle-based transmitting units may be provided for two different vehicles, with the vehicle-based transmitting units in both vehicles operable to actuate a common garage-based actuating device. The common actuating device may be operable to transmit a signal to open a single garage door in response to the signal transmitted by either vehicle-based transmitting unit, or may be operable to open one garage door in response to the signal from one of the vehicle-based transmitting units and another garage door in response to the signal from the other of the vehicle-based transmitting units. The common or single actuating device thus may be operable to receive and recognize or accept different signals from different vehicle-based transmitting units and may open a single garage door in response to the receiver receiving either signal or may open different garage doors in response to the receiver receiving the different signals.

For example, if an actuating device 114 is purchased with a vehicle (such as an optional item sold with the vehicle) the actuating device may be set up in a garage and may be operable to actuate a garage door opening device to open the garage door in response to the vehicle-based transmitting unit of the vehicle, as described above. If the homeowner has a second vehicle that has a second vehicle-based transmitting unit (such as a garage door opening vehicle-based transmitting unit or a key fob or other type of vehicle-based transmitter or the like), the actuating device 114 may be set or adjusted to recognize and authorize the signal of the second vehicle-based transmitting unit or other transmitter. For example, the actuating device 114 may be set to a "second signal recognizing mode" (such as by pressing a user input or button 137 or the like on actuating device 114). After the button 137 is pressed or actuated and the actuating device is in the second signal recognizing mode, the second vehicle-based transmitting unit may be actuated and the actuating device may function to recognize and authorize the signal or the code superimposed on the signal transmitted by the second vehicle-based transmitting unit. After the second code or signal is recognized and authorized, the actuating device may be operable to transmit the signal 119 to the garage door opening device 120 in response to the receiver receiving either the first code from the first vehicle-based transmitting unit or the second code from the second vehicle-based transmitting unit or other transmitter.

Optionally, it is envisioned that the button or input 137 could be used to set the actuating device to recognize and authorize a signal from a first vehicle-based transmitting unit (such as for a new vehicle or for aftermarket applications), without affecting the scope of the present invention. For example, an actuating device may be provided with a vehicle that is equipped with a vehicle-based transmitting unit, such as in the rearview mirror assembly or accessory module or console or the like, whereby the actuating device may not be initially synchronized with or authorized to recognize and accept the signal transmitted by the vehicle-based transmitting unit. For example, the vehicle-based transmitting unit may be operable to transmit a signal that matches the signal transmitted by a key fob or the like associated with the vehicle. A common actuating device (initially common to the vehicles of that particular car line or option or the like) may then be provided with the vehicle and may be set to recognize and authorize the signal transmitted by the vehicle-based transmitting device. A user may then purchase the vehicle with the vehicle-based transmitting unit and may set the actuating device provided with that vehicle (or an actuating device provided with another vehicle) to recognize and authorize the code or signal transmitted by the vehicle-based transmitting unit.

Optionally, the transmitter of the actuating device may be operable to transmit two different codes: one code in response to the receiver receiving the first code from the first vehicle-based transmitting unit to open one garage door, and the other code in response to the receiver receiving the second code from the second vehicle-based transmitting unit to open another garage door. The actuating device thus may transmit the same signal (in response to two different signals from the vehicle based transmitting units) for situations where both vehicles are parked in the same garage stall, such as a double stall or the like where both vehicles may enter through the same garage door, or may transmit different signals for situations where each vehicle is targeted for a separate garage or stall. Optionally, the actuating device of the present invention may be sold as a single unit, whereby the user may set it to authorize or accept one or more signals or codes from one or more vehicle-based transmitting units or the like.

Alternately, two vehicles, each individually equipped with a vehicle-based transmitting unit may communicate with two respective actuating devices in a garage in order to individually actuate a respective one of two garage door opening devices. Alternately, each of the actuating devices may be positioned at the home or in the garage and may be operable to individually actuate a single garage door opening device of the garage, such as for double stall garages and the like where it is desirable to have two vehicles equipped to open the same garage door.

The actuating device and vehicle-based garage door opening system of the present invention thus may learn the code or coded signal of a hand held transmitting unit associated with a garage door opening device and may transmit a signal with the appropriate code superimposed thereon. The signal transmitted by the transmitter of the actuating device may comprise a broad band signal covering a wide range of frequencies, such that the transmitter may comprise a low cost transmitter to reduce the cost of the garage door opening system. The receiver of the actuating device may be associated with the vehicle or with the vehicle-based transmitting unit, such as during manufacturing of the vehicle, so that the receiver need not be trained to recognize the signal transmitted by the vehicle-based transmitting unit.

Figure 5:
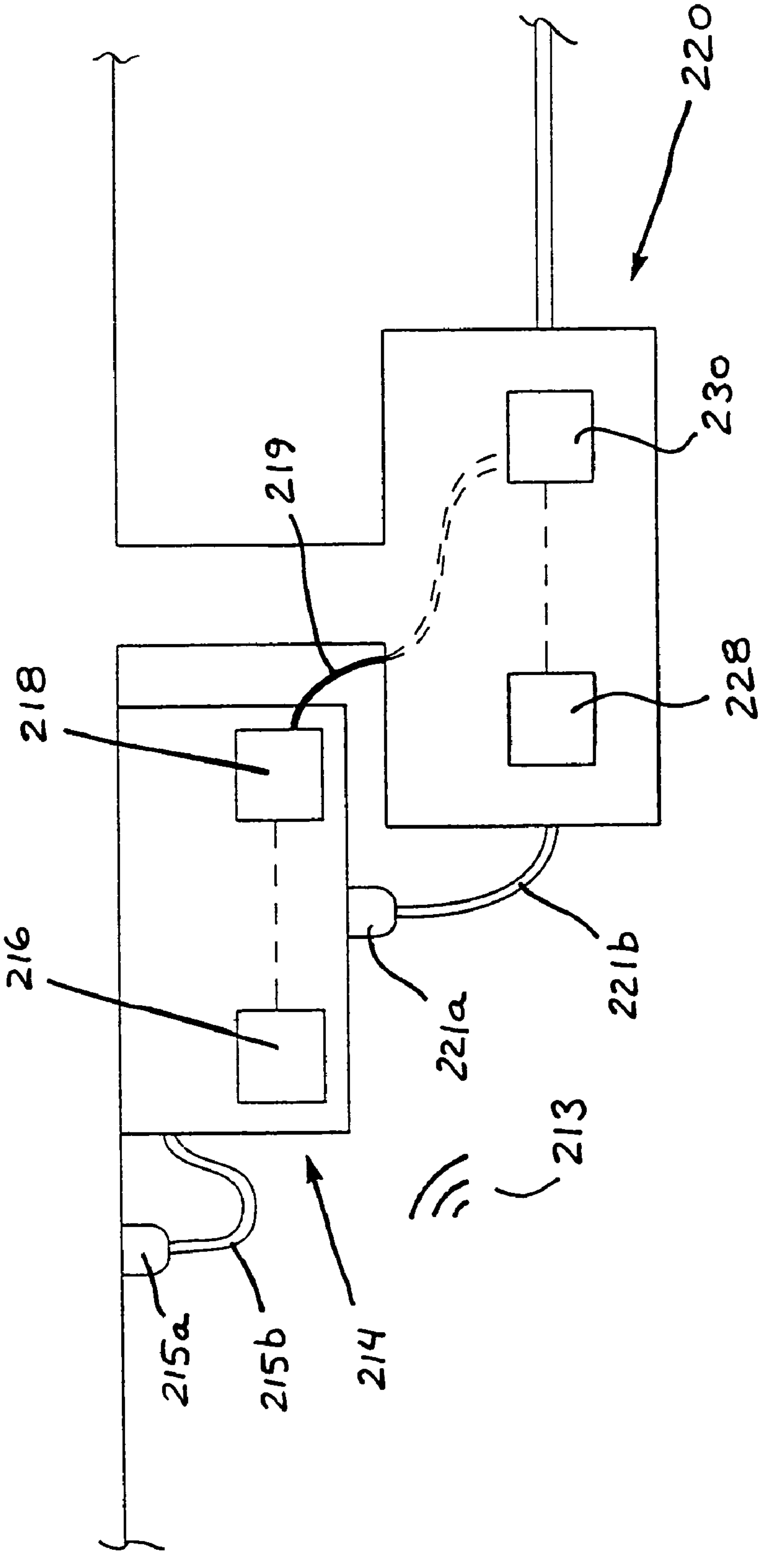
FIG. 5 is a plan view of another receiving and actuating device useful with the garage door opening system of FIG. 3.

Optionally, and with reference to FIG. 5, an actuating device 214 of a garage door opening system of the present invention may include an actuator 218 that is connected to or hard-wired to the garage door opening device 220, such that the actuating device 214 may directly actuate the garage door opening mechanism 230 in response to a receiver 216 of actuating device 214 receiving an appropriate signal from the vehicle-based transmitting unit associated with or recognized by the actuating device. As shown in FIG. 5, actuator 218 may connect to garage door opening device 220 via wires 219, such as at the terminals of the garage door opening device 220 that are used for connecting a push button device that is typically mounted to a wall within the garage. The actuator 218 thus may simply close the circuit between two wires to actuate the garage door opening mechanism 230 in a similar manner as a typical push button device. The actuator 218 is operable to actuate the garage door opening mechanism 230 via wires 219 in response to the receiver 216 receiving the signal 213 from the vehicle-based transmitting unit. Because the receiver 216 of actuating device receives the known code of the associated vehicle-based transmitting unit, the receiver 216 does not need to include any learning circuitry or algorithms. In aftermarket applications, however, the actuating device may include learning circuitry to learn and recognize the coded signal transmitted by one or more vehicle-based transmitting units.

As shown in FIG. 5, the actuating device 214 may be positioned at or near or adjacent to the garage door opening device 220. The actuating device may include an electrical socket or outlet for receiving the plug 221*a* of the power cord 221*b* of the garage door opening device 220. The actuating device 214 may include its own power cord 215*b* and plug 215*a* for plugging into a standard 110 volt outlet in the garage, such as at the garage ceiling, such as is typically provided in garages for powering garage door opening devices. The actuating device may thus provide power or pass through the power to the garage door opening device and thus may be positioned immediately adjacent to the garage door opening device without interfering with the electrical connection or hook up of the garage door opening device. The garage door opening device 220 may typically include the receiver 228 for receiving the signal from the hand held transmitting unit associated with and/or purchased with or packaged with the garage door opening device 220.

The actuating device of the present invention thus may provide a vehicle-based garage door opening system which does not require training of codes associated with the garage door opening mechanism at the garage door. Because the vehicle-based transmitting unit and the actuating device are associated with one another and correspondingly coded, no coding or teaching or setting up the devices after purchase of the system is required. The present invention thus eliminates the need to train the vehicle-based garage door opening system. Therefore, the vehicle-based transmitting unit and the receiving and actuating device of the vehicle-based garage door opening system of the present invention do not require costly learning or training circuitry to learn or train the units or devices to transmit or recognize other codes.

The vehicle-based transmitting unit may be positioned at or within an interior rearview mirror assembly of the vehicle, or may be positioned at or within an accessory pod or module or windshield electronics module or the like, which may be positioned at or near or may be associated with the interior rearview mirror assembly, such as in an accessory module/windshield electronics module of the types disclosed in U.S. patent application, Ser. No. 10/355,454, filed Jan. 31, 2003 by Schofield et al. for VEHICLE ACCESSORY MODULE, now U.S. Pat. No. 6,824,281; and/or Ser. No. 09/793,002, filed Feb. 26, 2001, entitled VIDEO MIRROR SYSTEMS INCORPORATING AN ACCESSORY MODULE, now U.S. Pat. No. 6,690,268, and U.S. Pat. Nos. 6,250,148; 6,341,523; 6,593,565; and 6,326,613, which are all hereby incorporated herein by reference.

Optionally, the vehicle-based transmitting unit may be positioned elsewhere in the vehicle, such as at an overhead console or at the instrument panel or at the steering wheel or the like, without affecting the scope of the present invention.

Therefore, the present invention provides a vehicle-based garage door opening system that is operable to actuate a garage door opening device in a garage in response to an actuating device (that is positioned remote from the vehicle) receiving an appropriate signal from a vehicle-based transmitting unit. The actuating device may be operable to learn a code associated with the garage door opening device and may transmit a broad band signal with the appropriate code to actuate the garage door opening device in response to the actuating device receiving the signal from the vehicle-based transmitting unit. Optionally, the actuating device may directly actuate the garage door opening device, such as via a wire or wires connected between the actuator and the garage door opening device, in response to the actuating device receiving the signal from the vehicle-based transmitting unit. Optionally, the actuating device may house or contain a domestic hand held transmitting unit associated with the garage door opening device and may actuate the hand held transmitting unit to transmit a signal to the garage door opening device to actuate the garage door opening device in response to the actuating device receiving the signal from the vehicle-based transmitting unit.

Changes and modifications in the specifically described embodiments may be carried out without departing from the principles of the present invention, which is intended to be limited only by the scope of the appended claims as interpreted according to the principles of patent law.

The embodiments of the invention in which an exclusive property or privilege is claimed are defined as follows:

1. A vehicle-based door opening system for opening a door at a building, the door being openable by a door opening device that is operable in response to a domestic hand held door opener transmitting unit associated with the door opening device, said vehicle-based door opening system comprising:

- a vehicle-based transmitting unit positioned at the vehicle and operable to transmit a first signal in response to a user input;
- a control positioned at the vehicle, said control being operable to activate a door locking mechanism of the vehicle in response to said first signal to lock and unlock the vehicle doors; and
- an actuating device positioned at the building and having a receiver for receiving said first signal from said vehicle-based transmitting unit, said actuating device is configured to receive a domestic hand held door opener transmitting unit and being operable to mechanically actuate the domestic hand held door opener transmitting unit in response to said receiver receiving said first signal, the domestic hand held door opener transmitting unit being operable to transmit a second signal when actuated, the second signal being received by the door opening device to open or close the door, said second signal being inoperable to lock and unlock the vehicle doors.

2. The vehicle-based door opening system of claim 1 including a portable transmitting unit associated with said control and operable to transmit said first signal in response to a user input.

3. The vehicle-based door opening system of claim 2, wherein said portable transmitting unit is operable to transmit a third signal which is receivable by said control, said control being operable to at least one of sound an alarm or horn of the vehicle, activate the ignition of the vehicle, activate lights of the vehicle and open the trunk of the vehicle in response to said third signal.

4. The vehicle-based door opening system of claim 1, wherein said first signal is receivable by a vehicle-based receiver associated with or in communication with said control.

5. The vehicle-based door opening system of claim 1, wherein said vehicle-based transmitting unit is fixedly positioned at the vehicle.

6. The vehicle-based door opening system of claim 1, wherein said vehicle-based transmitting unit is positioned at one of an interior rearview mirror assembly of the vehicle, an accessory module of the vehicle, a windshield electronics module of the vehicle, a console of the vehicle, an instrument panel of the vehicle and a steering wheel of the vehicle.

7. The vehicle-based door opening system of claim 1, wherein said vehicle-based transmitting unit, said control and said actuating device are associated with the vehicle.

8. The vehicle-based door opening system of claim 7, wherein said vehicle-based transmitting unit and said actuating device are associated with the vehicle at the vehicle assembly plant.

9. The vehicle-based door opening system of claim 1, wherein said vehicle-based transmitting unit is associated with said control and said actuating device and said vehicle-based door opening system is purchased as an aftermarket unit.

10. The vehicle-based door opening system of claim 1, wherein said first signal is different from said second signal.

11. The vehicle-based door opening system of claim 1 including an override function that is operable to cause said control to be non-responsive to said first signal when said override function is activated.

12. The vehicle-based door opening system of claim 11, wherein said override function automatically deactivates in response to a deactivating event to cause said control to be responsive to said first signal.

13. The vehicle-based door opening system of claim 12, wherein said deactivating event comprises at least one of a user input, activation of the vehicle ignition, deactivation of the vehicle ignition, opening of a vehicle door, closing of a vehicle door, stopping of vehicle movement, and passing of a period of time following activation of said override function.

14. The vehicle-based door opening system of claim 11, wherein said override function is activated in response to an activating event.

15. The vehicle-based door opening system of claim 14, wherein said activating event comprises at least one of a user input, activation of the vehicle ignition, deactivation of the vehicle ignition, opening of a vehicle door, closing of a vehicle door, locking of a vehicle door, unlocking of a vehicle door and movement of the vehicle.

16. The vehicle-based door opening system of claim 1, wherein the building comprises a garage and said vehicle-based door opening system is adapted for use with a garage door opening device.

17. The vehicle-based door opening system of claim 1, wherein said actuating device is operable to mechanically actuate the domestic hand held garage door opener transmitting unit in response to said first signal.

18. The vehicle-based door opening system of claim 17, wherein said actuating device includes an actuating member which is movable to depress a button on the domestic hand held garage door opener transmitting unit in response to said first signal.

19. A vehicle-based door opening system for opening a door at a building, the door being openable by a door opening device, which is operable in response to a domestic hand held garage door opener transmitting unit associated with the door opening device, said vehicle-based door opening system comprising:

a vehicle-based transmitting unit positionable at the vehicle and operable to transmit a first signal, said vehicle-based transmitting unit being operable to transmit said first signal to control at least one vehicle-based accessory, said at least one vehicle-based accessory comprising at least one of a vehicle door locking mechanism, a truck release mechanism, a vehicle ignition and an illumination source of the vehicle; and an actuating device positionable at or near the door opening device and operable to receive said first signal from said vehicle-based transmitting unit, said actuating device being configured to receive the domestic hand held garage door opener transmitting unit associated with the door opening device and being operable to mechanically actuate the domestic hand held garage door opener transmitting unit in response to said first signal from said vehicle-based transmitting unit, the domestic hand held garage door opener transmitting unit transmitting a second signal in response to actuation of the domestic hand held garage door opener transmitting unit by said actuating device to actuate the door opening device to open or close the door, said second signal being inoperable to control said at least one vehicle-based accessory.

20. The vehicle-based door opening system of claim 19, wherein the building comprises a garage and said vehicle-based door opening system is adapted for use with a garage door opening device.

21. The vehicle-based door opening system of claim 19, wherein said actuating device is operable to mechanically actuate the domestic hand held garage door opener transmitting unit in response to said first signal.

22. The vehicle-based door opening system of claim 21, wherein said actuating device includes an actuating member which is movable to depress a button on the domestic hand held garage door opener transmitting unit in response to said first signal.

23. The vehicle-based door opening system of claim 19 including a portable transmitting unit operable to transmit said first signal.

24. The vehicle-based door opening system of claim 23, wherein said at least one vehicle-based accessory comprises a door locking mechanism of the vehicle to unlock and lock the door locks of the vehicle, said door locking mechanism locking or unlocking the door locks in response to said first signal.

25. The vehicle-based door opening system of claim 24, wherein said portable transmitting unit is operable to transmit a third signal which is receivable by said control, said control being operable to at least one of sound an alarm or horn of the vehicle, activate the ignition of the vehicle, activate lights of the vehicle and open the trunk of the vehicle in response to said third signal.

26. The vehicle-based door opening system of claim 19, wherein said vehicle-based transmitting unit is fixedly positionable at the vehicle.

27. The vehicle-based door opening system of claim 19, wherein said vehicle-based transmitting unit is positionable at one of an interior rearview mirror assembly of the vehicle, an accessory module of the vehicle, a windshield electronics module of the vehicle, a console of the vehicle, an instrument panel of the vehicle, a steering wheel of the vehicle.

28. The vehicle-based door opening system of claim 19, wherein said vehicle-based transmitting unit and said actuating device are associated with the vehicle.

29. The vehicle-based door opening system of claim 28, wherein said vehicle-based transmitting unit and said actuating device are associated with the vehicle at the vehicle assembly plant.

30. The vehicle-based door opening system of claim 19, wherein said first signal is receivable by a vehicle-based receiver associated with or in communication with said at least one vehicle-based accessory.

31. The vehicle-based door opening system of claim 19, wherein said vehicle-based transmitting unit is associated with said actuating device and said vehicle-based door opening system is purchased as an aftermarket unit.

* * * * *